United States Patent
Boyte et al.

(10) Patent No.: US 6,561,390 B2
(45) Date of Patent: May 13, 2003

(54) COFFEE CARAFE WITH HIDDEN HANDLE SUPPORT

(75) Inventors: C. Laron Boyte, Collins, MS (US); Donald R. Ivy, Waynesboro, MS (US); Mahmoud F. Ismail, Coral Springs, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 09/954,758

(22) Filed: Sep. 17, 2001

(65) Prior Publication Data

US 2003/0052139 A1 Mar. 20, 2003

(51) Int. Cl.[7] ............................................. A47G 19/14
(52) U.S. Cl. ................. 222/475.1; 222/475; 222/465.1; 222/570; 220/737; 220/758; 220/759; 220/769
(58) Field of Search .............................. 222/475.1, 475, 222/570, 465.1; 220/737, 758, 759, 769; 215/396

(56) References Cited

U.S. PATENT DOCUMENTS

| | | | | |
|---|---|---|---|---|
| 2,004,883 A | * | 6/1935 | Wolcott | ............................ 53/3 |
| 2,378,867 A | * | 6/1945 | Reichart | ........................ 294/27 |
| 2,807,944 A | * | 10/1957 | Glass | ............................. 65/31 |
| 2,982,451 A | * | 5/1961 | Eisendrath | ................... 222/566 |
| 3,114,484 A | * | 12/1963 | Serio | ........................... 222/465 |
| 3,272,370 A | * | 9/1966 | Placenberg | ................. 215/100 |
| 3,306,505 A | * | 2/1967 | Serio | ........................... 222/465 |
| 3,330,449 A | * | 7/1967 | Bloomfield | .................. 222/475 |
| 3,400,865 A | | 9/1968 | Hester | |
| 3,516,580 A | | 6/1970 | Hester | |
| 3,606,102 A | | 9/1971 | Lowry et al. | |
| 3,632,025 A | * | 1/1972 | Harold | ........................ 222/472 |
| 4,090,648 A | * | 5/1978 | Roberts | ....................... 222/570 |
| 4,344,549 A | | 8/1982 | Paradis et al. | |
| 4,361,257 A | * | 11/1982 | Stone, Jr. | ..................... 222/464 |
| 4,838,463 A | * | 6/1989 | Roberts | .................... 222/465.1 |
| 4,907,719 A | * | 3/1990 | Spotholz et al. | ............... 222/1 |
| 4,938,377 A | * | 7/1990 | Jarvis | .......................... 220/216 |
| 5,025,939 A | * | 6/1991 | Bunn et al. | .................. 215/100 |
| 5,050,780 A | * | 9/1991 | Stone | .......................... 222/188 |
| 5,110,016 A | * | 5/1992 | Heimann et al. | ......... 222/475.1 |
| 5,111,975 A | * | 5/1992 | Roberts | .................... 222/475.1 |
| 5,224,634 A | * | 7/1993 | Graham | .................... 222/475.1 |
| 5,260,914 A | * | 11/1993 | Roberts | ........................ 368/10 |
| 5,379,925 A | * | 1/1995 | Mothrath et al. | ......... 222/475.1 |
| 5,752,618 A | * | 5/1998 | Trebitz et al. | .............. 220/642 |
| 6,234,364 B1 | * | 5/2001 | Nybakke et al. | ............. 222/469 |
| 6,273,306 B1 | * | 8/2001 | Takagawa | .................... 222/509 |

FOREIGN PATENT DOCUMENTS

| | | | | |
|---|---|---|---|---|
| DE | | 19517228 A1 | * 11/1996 | ........... A47G/19/14 |
| FR | WO-01/32063 A1 | | * 5/2001 | ............ A47J/27/21 |

* cited by examiner

*Primary Examiner*—David A. Scherbel
*Assistant Examiner*—Frederick Nicolas
(74) *Attorney, Agent, or Firm*—Lawrence J. Shurupoff

(57) ABSTRACT

A coffee carafe with a hidden handle support. The handle support is an annular band that extends around a rim of a glass jar for the coffee carafe. An annular collar fits over the annular band, hiding the handle support from view. The annular collar includes a pour spout and an annular flange that extends against an inside surface of the rim of the glass jar. A silicon adhesive or other suitable bonding agent is used to hold the annular collar in place. The use of the annular collar provides strong support for the handle. In addition, because the bonding agent that holds the annular flange in position against the glass jar does not have to support the handle, materials other than acrylonitrile-butadiene-styrene (ABS) plastic may be used for the annular collar and the handle. For example, polypropylene may be used as the material for these two components.

25 Claims, 3 Drawing Sheets

COFFEE CARAFE WITH HIDDEN HANDLE SUPPORT

FIELD OF THE INVENTION

The present invention relates generally to coffee makers, and more particularly to coffee carafes.

BACKGROUND OF THE INVENTION

Coffee makers are commonplace in household kitchens. The majority of these devices brew a batch of coffee and then store it for consumption within a short time. Some coffee brewing devices store coffee in a removable container, called a coffee carafe, that rests on a heating element within the brewing device during brewing and heating. A coffee carafe generally holds six to twelve servings of coffee, and includes a handle for carrying the coffee carafe without contacting hot coffee or hot parts of the coffee carafe. Coffee is brewed into the carafe, and the carafe is used for serving. To this end, most coffee carafes include a pouring spout opposite the handle that permits the user to grip the coffee carafe by the handle and pour coffee into a cup or different drinking containers.

For most conventional coffee makers, the coffee carafe is often used to fill the coffee maker prior to beginning the brewing process. A user fills the coffee carafe with water to a desired level, e.g., six cups, and pours the water into the coffee maker. The appropriate amount of coffee grinds are added to the coffee maker, and the coffee carafe is placed on the heating element. The water is heated in the coffee maker, and flows through the coffee grinds, brewing the coffee. The brewed coffee flows into the coffee carafe.

Most coffee carafes are glass so that a user may easily determine the amount of water being put into the coffee maker. The clear glass coffee carafes typically include measurement markings along an outer surface of the glass to aid the user in determining the amount of water in the carafe. The measurements are also helpful for determining how much coffee remains in the carafe.

Using glass for the carafe has other advantages. Glass is resistant to the high brewing temperatures, and is sufficiently thermally conductive so that coffee may be heated while the glass carafe is sitting on the heating element.

Although prior art glass coffee carafes work well for their intended purpose, there are problems associated with their construction and use. One problem is attaching the handle, which is typically plastic, to the glass portion of the carafe, herein referred to as the glass jar or decanter. The attachment of the handle to the jar must be sturdy to avoid accidents. Attaching fasteners to glass is difficult, because fittings are difficult to form in glass, and are brittle when formed. In addition, although adhesives may be used to attach the handles, their use is limited, because many adhesives break down at the high temperatures used in brewing and heating coffee.

For many contemporary coffee carafes, the attachment of the handle to the coffee carafes is provided by a metal band. A grove is manufactured at the upper neck of the glass jar. A metal, annular band extends around the grove. The handle is mechanically attached to the metal band. This solution works well, but many users do not like the appearance of the annular metal band. Coffee and other materials may lodge behind the band, and may be difficult to remove. Moreover, the narrowed neck portion of the glass jar limits the alternatives for providing a pouring spout. Forming the pouring spout integrally with the glass is difficult, because a large structure protruding from the neck may be subject to breakage, and to small of a structure may provide poor pouring (e.g., dripping or other problems).

As an alternative to the annular metal band, many manufacturers utilize an integral pouring spout and handle structure that is attached to a neck of a glass coffee jar. The combined pouring spout and handle structure is typically formed of plastic. Often, the plastic structure is clamped to the neck of the glass coffee jar, but the clamped attachment of a pouring spout is time consuming and costly. Even when the spout is clamped tightly during manufacture of the decanter, it tends to become loose during usage.

Other manufacturers utilize adhesives to attach the integral pouring spout and handle to the glass coffee jar. These methods of attachment also have their problems. The use of adhesives is limited, because many adhesives cannot withstand the heat generated during the coffee-making process. Moreover, of the adhesives that can withstand the heat, the bond formed between the adhesives and most plastics is not sufficient to provide the strength needed for securing the handle to the glass jar. Thus, typically only acrylonitrile-butadiene-styrene (ABS) plastic may be used in these structures, which is expensive.

Other manufacturers use epoxy to attach the handle and spout structure to the glass jar. Epoxy forms a rigid seal between the pouring spout and handle structure and the glass jar, but can be brittle after hardening, and may break during shipment or handling. In addition, epoxy resins do not adhere well to the usual spout materials, allowing the seal between the spout and the glass to be readily broken and cause fluid leakage.

SUMMARY OF THE INVENTION

The present invention solves many problems of the prior art by providing a coffee carafe with a hidden handle support. The handle support is an annular band that extends around a neck of a glass jar for the coffee carafe. A handle for the coffee carafe is attached to the annular band, for example by a screw.

An annular collar fits over the annular band. The annular collar includes a pour spout and an annular flange that extends against an inside surface of the neck of the glass jar. A silicon adhesive or other suitable bonding agent is used to hold the annular collar in place.

The annular collar covers the handle support, hiding it from view. Thus, the outer surface of the coffee carafe, formed by the annular collar and the glass jar, is smooth and sleek in appearance. The handle support is protected from the coffee by the annular collar, preventing coffee from flowing into the seal between the handle support and the glass jar, and providing a coffee carafe that is easy to clean.

The use of the annular collar provides strong support for the handle. In addition, because the bonding agent that holds the annular flange in position against the glass jar does not have to support the handle, materials other than acrylonitrile-butadiene-styrene (ABS) plastic may be used for the annular collar and the handle. For example, polypropylene may be used as the material for these two components.

Other advantages will become apparent from the following detailed description when taken in conjunction with the drawings, in which:

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Figure 1:
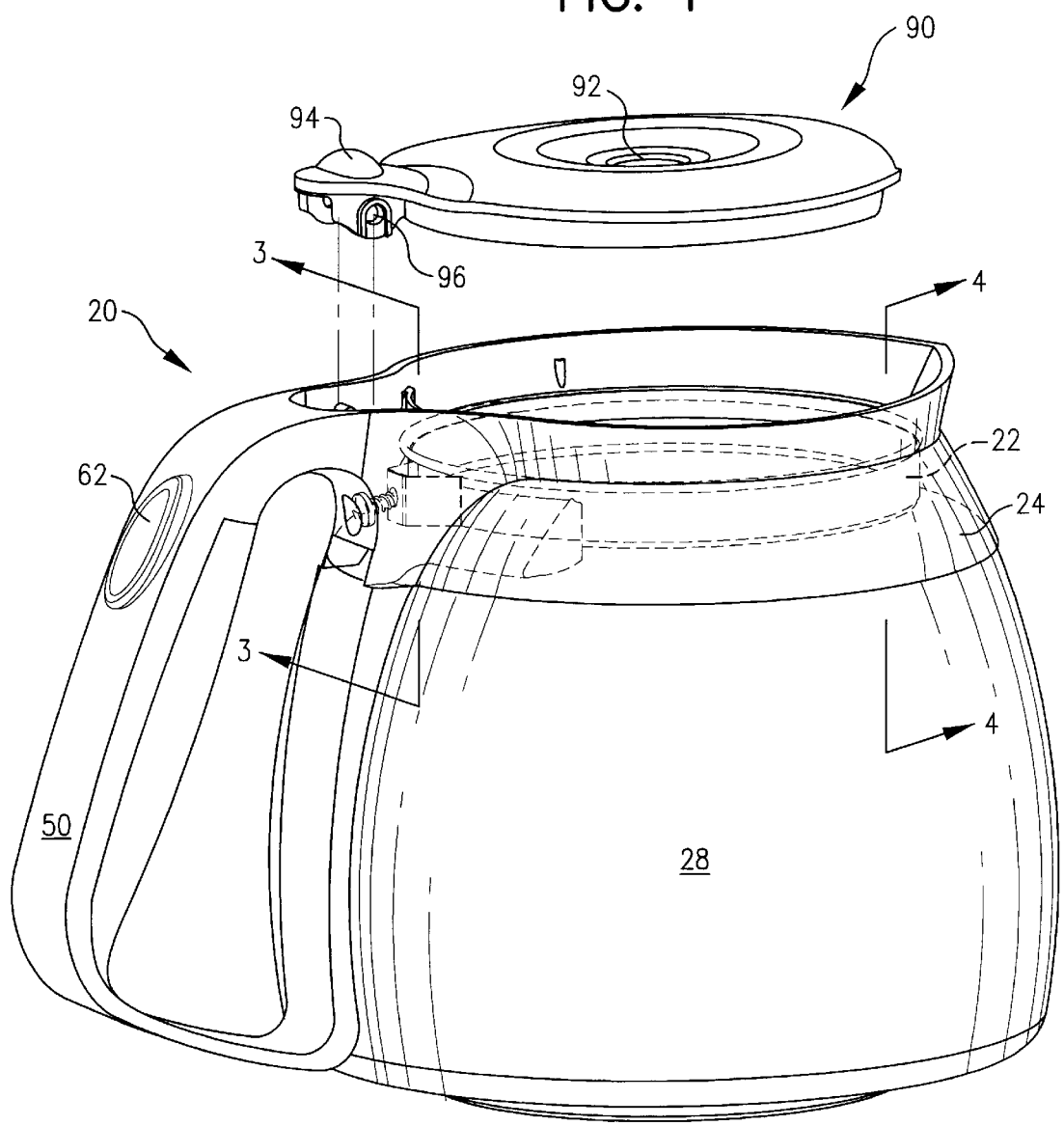
FIG. 1 is a front, side perspective view of a coffee carafe made in accordance with the present invention, with a lid of the coffee carafe removed to show detail.
Figure 2:
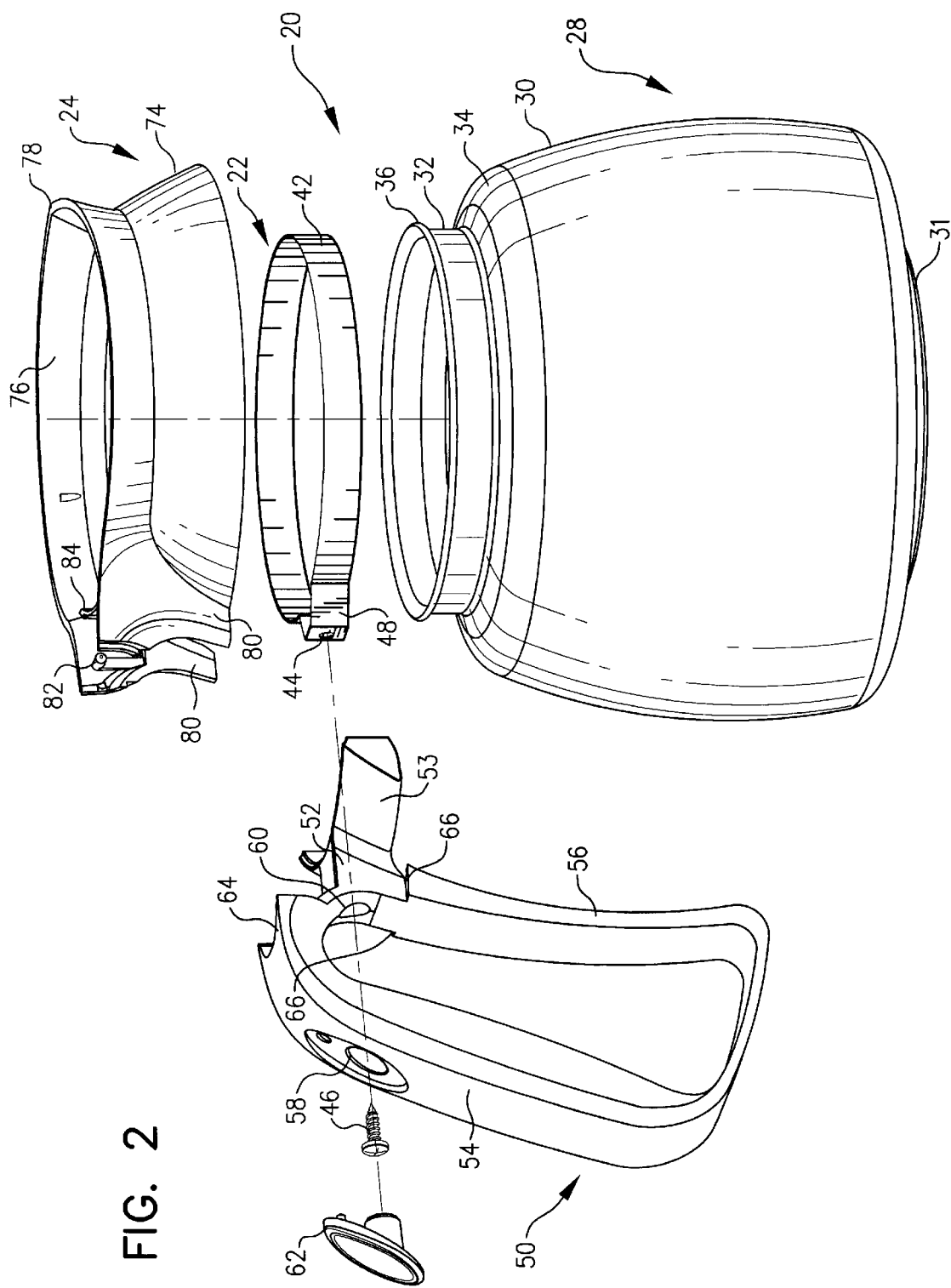
FIG. 2 is an exploded perspective view of the coffee carafe of FIG. 1.

Briefly described, with reference to FIG. 1, the present invention provides a coffee carafe 20 with a hidden handle support 22 (shown in phantom in FIG. 1, and removed in FIG. 2). An annular collar 24 with a spout covers the handle support 22, hiding it from view.

The coffee carafe 20 includes a glass jar 28, which is generally circular in cross section. The glass jar 28 includes sides 30 that taper from a bottom 31 inward to a rim 32 at the top of the glass jar 28. The rim 32 may have a structure such as an upwardly extending annular flange or neck, similar to the structure shown in the drawings, or may just be the edges of an opening at the top of the jar 28. The sides 30 taper gradually to a shoulder 34, where the taper is more extreme, and the sides extend to almost horizontal. The rim 32 extends vertically upward from the shoulder 34, and extends outward at its upper edge to form a rolled lip 36.

The handle support 22 is a split band having a generally circular portion 42. The two ends of the split band include fittings 44 for receiving a fastener, such as a screw 46. The portion of the handle support including the fittings 44 extends outward to form a protrusion 48. The protrusion 48 permits the shank of the screw 46 to extend into the fittings 44 without engaging the rim 32 of the glass jar 28. The handle support 22 is preferably metal, such as a steel band, but other materials may be used.

A handle 50 for the coffee carafe 20 is attached to the annular band 22, for example by a screw 46. The handle 50 includes an extension 52 having an arc-shaped arm 53 that is sized and shaped to fit against the top of the shoulder 34 of the glass jar 28, and into the rim 32 of the glass jar. The handle 50 further includes a grip portion 54 and a finger protector 56, the two of which are positioned and configured to receive the fingers of a user when the coffee carafe 20 is held, for example for pouring a cup of coffee. The handle 50 is preferably formed of polypropylene, but other materials may be used.

A tool hole 58 is extends through a top of the grip portion 54, and aligns with a screw hole 60 on the finger protector 56. A cap 62 may be provided for fitting over the tool hole 58. If desired, a logo or other information may be displayed on the outer surface of the cap 62.

The grip portion 54 of the handle 50 includes an arc-shaped cavity 64 at its upper leading edge. The arc-shaped cavity is located above the screw hole 60.

The finger protector 56 enlarges in cross section until it reaches a bottom portion of the extension 52. At this location, a pair of shoulders 66 are formed at the top of the finger protector 56 and on opposite sides of the extension 52.

The extension 52 is generally rectangular shaped, and extends upward from the shoulders 66. The screw hole 60 fits inside the extension, and is in communication with a cavity 68 (FIG. 3) that extends to the opposite side of the extension and out of the arm 53. The cavity 68 is sized and shaped to receive the protrusion 48 on the handle support 42, as is further described below.

Figure 4:
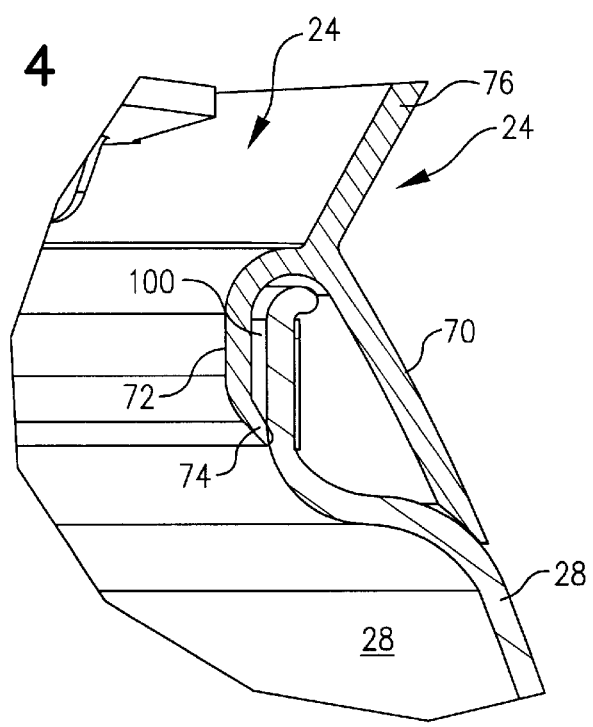
FIG. 4 is cutaway view taken along the section lines 4—4 of FIG. 1.

The annular collar 24 is configured and sized to fit over the handle support 22 and the rim 32 of the glass jar 28. To this end, as can be seen in FIG. 4, the annular collar 24 includes an outer, downwardly-depending flange 70 and an inner, downwardly-depending flange 72. The outer, downwardly-depending flange 70 and the inner, downwardly-depending flange 72 extend on opposite sides of the rim 32 of the glass jar 28. The outer, downwardly-depending flange 70 is substantially linear in cross-section, and tapers outward to abut the outer edge of the shoulder 34 of the glass jar 28. The inner, downwardly-depending flange 72 arcs inward, and then outward, to form an outwardly-facing lip 74 at its lower end. The annular collar 24 is preferably formed of polypropylene, but other materials may be used.

Figure 3:
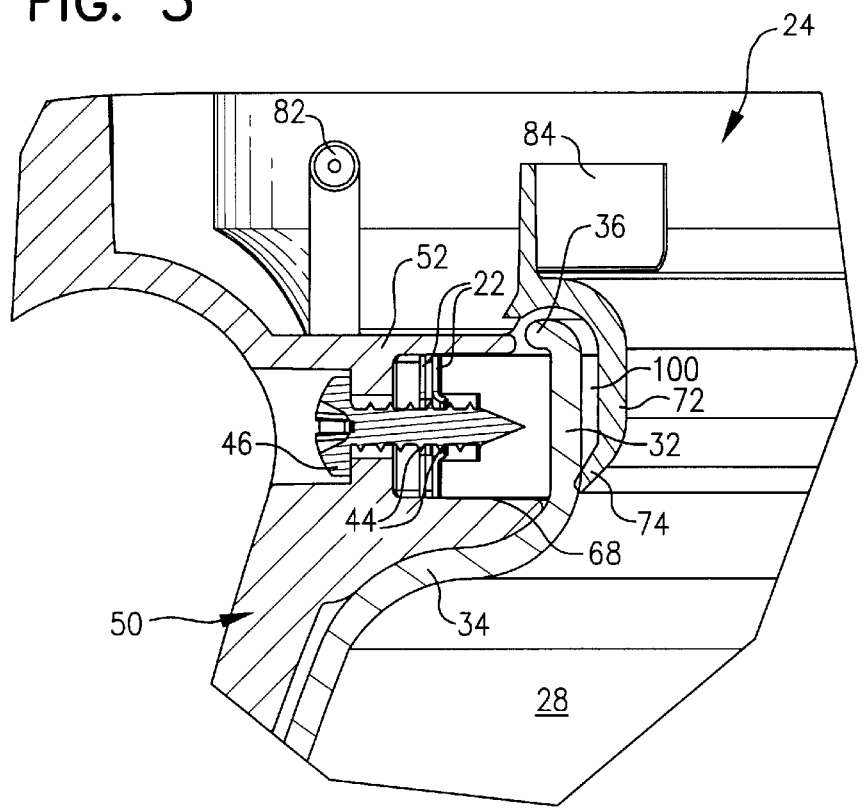
FIG. 3 is cutaway view taken along the section lines 3—3 of FIG. 1.

An outwardly-extending flange 76 extends upward out of the annular collar 24. The outwardly-extending flange 76 forms a spout 78 (FIG. 2) at a front end of the annular collar 24, and wraps around to the back of the annular collar, where it extends downward as two legs 80. The legs 80 are configured to align on opposite sides of the extension 52 of the handle 50, and include inwardly-depending posts 82 on upper, inner sides (only one of which is shown in the drawings). An interior wall 84, portions of which are shown in FIGS. 2 and 3, extends between the legs 80, and, together with the outwardly-extending flange 76, forms a circular opening at the top of the annular flange 24.

A lid 90 (FIG. 1) is provided that fits over the top opening of the annular collar 24. The lid 90 includes a hole 92 through its center, through which coffee passes during the brewing process. The rear portion of the lid 90 includes a round protrusion 94 and a pair of sockets 96 (only one is shown in FIG. 1). The sockets 96 are configured to fit over and attach to the inwardly-depending posts 82 on the annular collar 24.

To assemble the coffee carafe 20, the handle support 22 is placed around the rim 32 of the glass jar 28. The cavity 68 of the handle is then aligned over the protrusion 48 on the handle support 22, and the screw 46 is inserted through the screw hole 60. A screwdriver or similar tool may be inserted through the tool hole 58 to engage the tool receiving pattern on the head of the screw 46.

As the screw 46 is tightened, the handle support 22 compresses and tightens around the rim 32 of the glass jar 28. Tightening continues until the handle 50 is firmly in place, and there is no play in the connection between the handle and the glass jar 28. However, the screw 46 should not be tightened so much as to damage the rim 32 of the glass jar 28. As an example, the screw 46 may be tightened to between 8 and 12 pounds torque. Other settings may be appropriate depending upon the thickness of the glass jar 28 and the configuration of the handle support 22. The cap 62 may then be placed over the tool hole 58.

After the handle 50 is connected to the glass jar 28 by the handle support 22, the annular collar 22 is attached to the glass jar. To effect the attachment, a bonding agent, e.g., FDA approved black silicon adhesive, is applied inside the inner, downwardly-depending flange 72, generally at the location 100 shown in FIGS. 3 and 4. The annular collar 22 is then placed over the top of the glass jar 28, so that the inner, downwardly-depending flange 72 extends just inside the rim 32, and the outer, downwardly-depending flange 70 extends outside the rim and abuts against the shoulder 34. The outer, downwardly-depending flange 70 extends around the shoulder 34, and is supported around its perimeter by the shoulder.

The inner, downwardly-depending flange 72 is preferably tightly toleranced against the inner edge of the rim 32. To this end, the outwardly-facing lip 74 is slightly deformable so that it is toleranced to a dimension that is less than the inner circumference of the rim 32, but still may be pushed in the rim. The annular collar 24 is placed on the glass jar 28 so that the outwardly-facing lip 74 is just inside the rolled lip 36 of the rim 32, and is pressed hard into position, causing the outwardly-facing lip 74 to slightly deform inwards, leaving a tight contact between the outwardly-facing lip 74 and the rim. The annular collar 24 is held in this position until the bonding agent dries, or at least until the bonding agent maintains the position of the outwardly-facing lip 74.

When the annular collar 24 is placed on the glass jar 28, the legs 80 are seated against the shoulders 66 on the handle 50. In this manner, the spout 78 on the annular collar 24 is properly aligned.

When the annular collar 24 is placed on the glass jar 28, the outer, downwardly-depending flange 70 abuts against the shoulder 34, and prevents further downward movement. If the outer, downwardly-depending flange 70 is also made of a slightly deformable material, pressure downward on the annular collar 24 can form a watertight seal between the annular collar and the glass jar 28. This watertight seal aids in maintaining the cleanliness of the coffee carafe 20. To the extent a watertight seal is not formed by the tight connection of the parts (e.g., because of manufacturing defects or incorrect tolerances), the bonding agent may make the connection watertight by not letting fluids pass its connection.

The lid 90 may then be placed on the assembled coffee carafe 20. The sockets 96 are placed on the inwardly-depending posts 82, and the round protrusion 94 is centered in the cavity 64 of the handle 50. A user may engage the round protrusion 94 with his or her thumb to raise the front end of the lid 90.

As can be seen in FIG. 4, the annular collar 24 and the shoulder 34 of the glass jar 28 are arranged so that the outer, downwardly-depending flange 70 and sides 30 of the glass jar form a smooth transition. In addition, because the outwardly-facing lip 74 of the inner, downwardly-depending flange 72 is tightly fit against the inner surface of the rim 32 of the glass jar 28, a watertight seal is formed between these two members, preventing coffee or other liquids from leaking through the connection. To the extent a watertight seal is not formed by the tight fit of the two members, the bonding agent seals the two, forming a watertight seal. The inner, downwardly-depending flange 72 and the outer, downwardly-depending flange 70 thereby form an aesthetically-pleasing, solid connection between the annular collar 24 and the glass jar 28. The bonding agent holds this connection in place for brewing of coffee or for cleaning of the coffee carafe 20, for example in a dishwasher.

The coffee carafe 20 of the present invention provides additional benefits. The handle support 22 provides a secure connection between the handle 50 and the glass jar 28, so that an adhesive or other bonding agent is not required for this connection. This feature permits the annular collar 24 and the handle 50 to be formed of a variety of different materials, including materials that typically cannot be used in coffee carafes, because the materials do not sufficiently bond with glass to provide enough support for a connection between a handle and a glass jar. For example, the annular collar 24 and the handle 50 may be formed of polypropylene, which is less expensive to manufacture, but is usually not used for coffee carafes because contemporary bonding agents that are capable of withstanding coffee brewing temperatures do not sufficiently bond with the material to support a handle to glass connection.

The annular collar 24 also hides the handle support 22 from view. This feature is desired by users for both aesthetics and cleanliness.

Because a variety of materials may be used for the annular collar 24, the spout 96 may be formed in a number of different ways. If a proper material is selected, a designer may design a spout that has exemplary pouring, without concern of breakage.

The advantages of the coffee carafe 20 herein described may be used to construct other liquid vessels, such as water pitchers or tea pots. However, the present invention has particular application for carafes which are used at high temperatures, and utilize a glass jar.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A carafe comprising:
   a glass jar having a rim;
   a handle support comprising an adjustable band extending around the rim;
   a handle secured to the glass jar via the adjustable band; and
   an annular collar comprising:
     a spout;
     an outer flange that extends over and covers the handle support and the rim so as to hide the adjustable band from view; and
     an inner flange that extends into the rim.

2. The carafe of claim 1, wherein the inner flange comprises a lip that rolls inward against the rim.

3. The carafe of claim 2, wherein the inner flange forms a watertight seal with the rim.

4. The carafe of claim 1, wherein the annular collar comprises polypropylene.

5. The carafe of claim 4, wherein the annular collar is attached to the glass jar by a bonding agent.

6. The carafe of claim 5, wherein the bonding agent comprises silicon adhesive.

7. The carafe of claim 1, wherein the annular collar is attached to the glass jar by a bonding agent.

8. The carafe of claim 7, wherein the bonding agent comprises silicon adhesive.

9. The carafe of claim 1, wherein the handle is attached to the handle support by a screw.

10. The carafe of claim 1, further comprising a lid that fits over the annular collar.

11. The carafe of claim 1, wherein the glass jar comprises a shoulder, and wherein the outer flange abuts against the shoulder.

12. The carafe of claim 11, wherein the outer flange forms a watertight seal with the shoulder.

13. The carafe of claim 1, wherein the adjustable band comprises steel.

14. A carafe comprising:
   a glass jar having a rim;
   a handle support comprising an adjustable band extending around the rim;
   a handle secured to the glass jar via the adjustable band; and
   an annular collar comprising:
      a spout; and
      an outer flange that extends over and covers the handle support and the rim so as to hide the adjustable band from view.

15. The carafe of claim 14, wherein the annular collar comprises polypropylene.

16. The carafe of claim 15, wherein annular collar is attached to the glass jar by a bonding agent.

17. The carafe of claim 16, wherein the bonding agent comprises silicon adhesive.

18. The carafe of claim 14, wherein annular collar is attached to the glass jar by a bonding agent.

19. The carafe of claim 18, wherein the bonding agent comprises silicon adhesive.

20. The carafe of claim 14, wherein the handle is attached to the handle support by a screw.

21. The carafe of claim 14, further comprising a lid that fits over the annular collar.

22. The carafe of claim 14, wherein the glass jar comprises a shoulder, and wherein the outer flange abuts against the shoulder.

23. The carafe of claim 22, wherein the outer flange forms a watertight seal with the shoulder.

24. The carafe of claim 14, wherein the adjustable band comprises steel.

25. A carafe comprising:
   a glass jar having a rim and a shoulder below the rim;
   a metal band extending around the rim;
   an annular collar comprising:
      a spout;
      an outer flange that extends over the handle support and the rim so as to hide the metal band from view; and
      an inner flange that extends into the rim; and
   a handle attached to the metal band.

\* \* \* \* \*